US008423521B2

(12) United States Patent
Wang et al.

(10) Patent No.: US 8,423,521 B2
(45) Date of Patent: Apr. 16, 2013

(54) METHOD AND APPARATUS FOR STORING DOCUMENT DATA IN DOCBASE MANAGEMENT SYSTEM

(75) Inventors: Donglin Wang, Beijing (CN); Haifeng Jiang, Beijing (CN); Ningsheng Liu, Beijing (CN); Liwei Wang, Beijing (CN)

(73) Assignee: Sursen Corp., Beijing (CN)

( * ) Notice: Subject to any disclaimer, the term of this patent is extended or adjusted under 35 U.S.C. 154(b) by 201 days.

(21) Appl. No.: 12/701,857

(22) Filed: Feb. 8, 2010

(65) Prior Publication Data

US 2010/0146005 A1    Jun. 10, 2010

Related U.S. Application Data

(63) Continuation of application No. PCT/CN2008/072010, filed on Aug. 15, 2008.

(30) Foreign Application Priority Data

Aug. 15, 2007   (CN) .......................... 2007 1 0120325

(51) Int. Cl.
*G06F 17/30* (2006.01)

(52) U.S. Cl.
USPC ............ 707/693; 707/694; 715/243; 715/277

(58) Field of Classification Search ........................ None
See application file for complete search history.

(56) References Cited

U.S. PATENT DOCUMENTS

| 6,105,044 | A  * | 8/2000 | DeRose et al. ................ 715/234 |
| 6,546,406 | B1 * | 4/2003 | DeRose et al. ................ 715/234 |
| 7,243,302 | B1 * | 7/2007 | Rej .............................. 715/255 |
| 7,529,756 | B1 * | 5/2009 | Haschart et al. ..................... 1/1 |
| 2001/0018697 | A1 * | 8/2001 | Kunitake et al. ............. 707/517 |
| 2005/0091581 | A1 * | 4/2005 | Bezrukov et al. ............ 715/513 |
| 2005/0187954 | A1 * | 8/2005 | Raman et al. ................. 707/100 |
| 2006/0101058 | A1 * | 5/2006 | Chidlovskii ................... 707/102 |
| 2006/0149775 | A1 * | 7/2006 | Egnor ........................... 707/102 |
| 2006/0235840 | A1 * | 10/2006 | Manikutty et al. ................ 707/4 |
| 2006/0235855 | A1 * | 10/2006 | Rousseau et al. ............ 707/100 |
| 2006/0259524 | A1 * | 11/2006 | Horton ......................... 707/201 |
| 2006/0294459 | A1 * | 12/2006 | Davis et al. .................. 715/513 |
| 2008/0168135 | A1 * | 7/2008 | Redlich et al. ............... 709/204 |
| 2008/0270361 | A1 * | 10/2008 | Meyer et al. ..................... 707/3 |

OTHER PUBLICATIONS

First Office Action issued for Chinese Patent Application No. 200710120325.3.
EP Search Report for European Patent Application No. 08784001.3; Dec. 22, 2010.
Cleveland, Gary; "Overview of Document Management Technology"; Internet Citation; Jun. 1, 1995; XP-002515125; pp. 1-8.
Dr. G.S.D. Farrow et al; "Conversion of Scanned Documents to the Open Document Architecture" Proceedings of the International Conference on Acoustics, Speech, and Signal Processing 1. Adelaide,; Apr. 19-22, 1994.

* cited by examiner

*Primary Examiner* — Anteneh Girma
(74) *Attorney, Agent, or Firm* — David Xue; Goodwin Procter LLP (57) ABSTRACT

A method and an apparatus for storing document data in a docbase management system are provided. In the method, document data is described by using a tree structure, the document data is split into multiple data fragments based on the tree structure when the document data is being stored, and the data fragments are stored, and the relation of the data fragments is recorded, wherein, each data fragment corresponds to a subtree or a node in the tree structure.

8 Claims, 4 Drawing Sheets

METHOD AND APPARATUS FOR STORING DOCUMENT DATA IN DOCBASE MANAGEMENT SYSTEM

CROSS-REFERENCE TO RELATED APPLICATION

This application claims the benefit of and is a continuation of PCT/CN2008/072010 filed Aug. 15, 2008, which is a PCT filing of CN 200710120325.3 filed Aug. 15, 2007, both of which applications are fully incorporated herein by reference.

FIELD OF THE INVENTION

The invention relates to document storage technology, and particularly, to method and apparatus for storing document data in a docbase management system.

BACKGROUND OF THE INVENTION

A docbase management system is a complicated software system adapted to organize, manage, secure, store and show massive electronic documents. In conventional docbase management systems, all document data are stored in a single file and the data are updated and queried by accessing the file. However, along with the continuous increase of quantity of information, the document data stored in the docbase management system increases sharply. When mass amount of data are stored in a single file, update and query of the data become very complicated, and the contents in which a user is interested cannot be located in a short time, i.e., the efficiency of content extraction is low. It can be seen that the conventional storage manner is not suitable for mass amount of data which is increasing continuously.

SUMMARY OF THE INVENTION

Embodiments of the present invention provide a method and apparatus for storing document data in a docbase management system to query and extract document contents in a flexible and efficient way.

In the method for storing document data in a docbase management system provided by an embodiment of the present invention, the document data is described by a tree structure, and when storing the document data, the method includes:

splitting the document data into multiple data fragments based on the tree structure; and storing the data fragments, and recording the relation of the data fragments, wherein, each data fragment correspond to a subtree or a node in the tree structure.

The apparatus for storing document data in a docbase management system provided by an embodiment of the present invention includes:

a first unit, adapted to split document data into multiple data fragments based on a tree structure; and a second unit, adapted to store the data fragments and record the relation of the data fragments, wherein, each data fragment generated by the splitting of the first unit correspond to a subtree or a node in the tree structure.

According to the method and apparatus for storing document data in a docbase management system provided by embodiments of the present invention, document data is split into multiple data fragments based on the tree structure of document data, and the data fragments are stored based on the tree structure. As the document data are split and stored in smaller data fragments, the hierarchical level of a data fragment can be located quickly and accurately when a user queries or accesses the document data, thus the data query and content extraction can be performed flexibly and efficiently, and the document transmission workload in web-based document applications can be reduced.

DETAILED DESCRIPTION OF THE INVENTION

The present invention is further explained hereinafter with reference to the accompanying drawings so as to make the objective, the technical solution and merits thereof more apparent.

The method provided by an embodiment of the present invention for storing document data in a docbase management system may include: splitting document data of a document into multiple data fragments and recording the relation of the data fragments. When the document data is described in a tree structure, the document data shall be split into multiple sub trees when saved, with each sub tree being a data fragment, then the tree structure formed after the split shall be recorded.

To be specific, split of the document data can start at any node in the tree structure, and the data fragments generated shall be the sub trees that root from the node; if the node is a leaf node, the sub tree will have only one node. Multiple data fragments are generated by repeating the above split process.

The starting node of the split process can be chosen arbitrarily and the split process can be terminated at any time. The sub trees generated can further be split by using the same method. In a preferred technical scheme of the present invention, a storage granularity is defined for the whole tree structure, and the document data with the tree structure shall be split based on the storage granularity. For example, when the storage granularity is page, the split shall be performed at all page level nodes, i.e., all sub trees which root nodes are page level nodes will be taken out as data fragments. In another preferred technical scheme, different storage granularities can be set for different parts of a tree structure and different parts of the tree structure are split according to the different granularities. For example, all data in one document set may be split at page level nodes while data in other document sets may be split at document level nodes.

Figure 1:
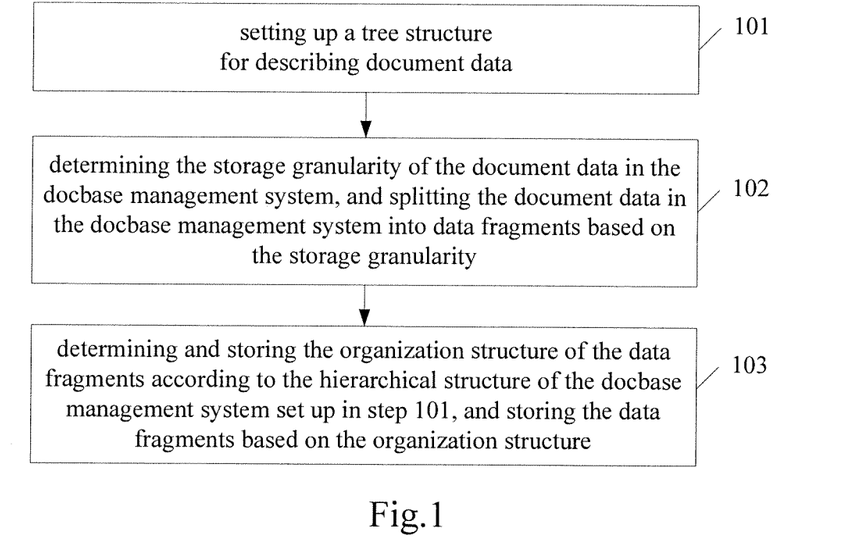
FIG. 1 is a flow chart illustrating a method for storing document data in a docbase management system according to an embodiment of the present invention.

FIG. 1 is a flow chart illustrating a method for storing document data in a docbase management system in accordance with an embodiment of the present invention. As shown in FIG. 1, the method may include steps as follows.

In step 101, document data in a docbase management system is described utilizing a tree structure. The nodes in the tree structure describing the document data may include the following from the root to leaves: docbases, documents, pages, layers, object streams and layout objects. The tree structure describing the document data may also be called the organization structure of the document data.

In step 102, the storage granularity of the document data in the docbase management system is defined, and the document data in the docbase management system is split into data fragments based on the storage granularity.

The storage granularity of the document data is related to the tree structure supported by the docbase management system and information of the organization structure of the document data.

If the tree structure of the document data includes document level nodes and page level nodes, the storage granularity of the document data may either be document or page. If the organization structure of the document data includes only one hierarchy level, i.e., document level, the document data cannot be split into pages and the storage granularity of the document data shall be document. However, the organization structure of the document data in the docbase management system should at least support document level hierarchy.

When the storage granularity of the document data is defined, the document data shall be split into data fragments based on the storage granularity as the minimum unit in the split process.

In step 103, the data fragments are stored based on the organization structure of the document data.

Compared with conventional art, which stores all document data in a docbase management system as one single file, the method of the present invention provides smaller storage granularity when saving documents and thus makes the update and search of the data easier; by using the method of the present invention, when a document data search and content extraction are implemented, the requested contents can be located quickly, hence flexible and efficient data search and content extraction can be achieved.

Specifically, in the docbase management system provided by embodiments of the present invention, the tree structure of the document data in the docbase management system can be represented in three ways: in an eXtensible Markup Language (XML) database way, in a file system way and in a relational database way. Three embodiments are given hereinafter to illustrate the three ways.

Figure 3:
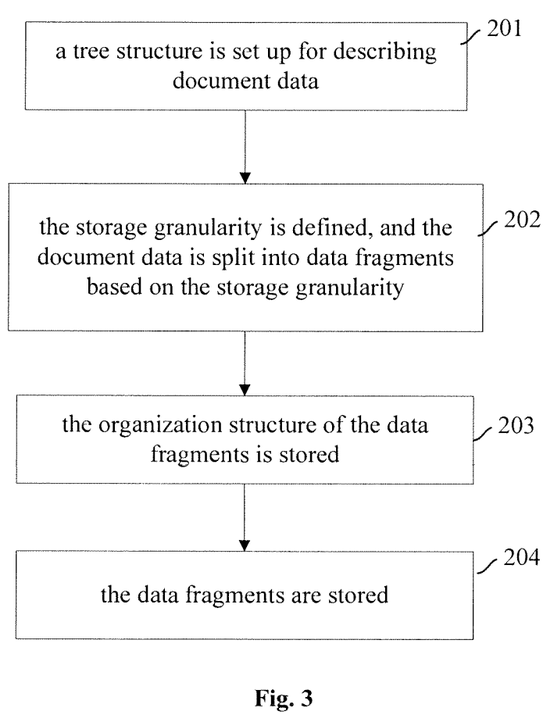
FIG. 3 is a flow chart illustrating a method for storing document data in a docbase management system utilizing an XML database.

In the first embodiment of the present invention, the tree structure of the document data in the docbase management system is represented using an XML database. According to such manner, the method for storing document data in a docbase management system provided by the present invention shall include the following steps as shown in FIG. 3.

In step 201, a tree structure is set up for describing document data.

In this step, the nodes in the tree structure adopted to describe the document data in the docbase management system may include the following from the root to leaves: docbases, document sets, documents, pages, layers, object streams and layout objects.

The method for representing such tree structure of the document data in the docbase management system can be:

representing the tree structure of a docbase by utilizing the tree structure of the XML database and mapping the hierarchical levels above the document level in the docbase onto the hierarchical level of collections in the XML database.

For example, the tree structure of the XML database can be adopted for representing hierarchical levels of the docbase that include document sets, documents, pages, layers and layout objects, i.e., a document set includes multiple documents, a document includes multiple pages, a page includes multiple layers and a layer includes multiple layout objects.

In step 202, the storage granularity of the document data in the docbase management system is defined, and the document data in the docbase management system is split into data fragments based on the storage granularity.

In this embodiment, the storage granularity of the document data may be defined by: determining the storage granularity of the document data according to the storage granularity configured for the docbase management system and the organization structure of the document data. And the storage granularity of the docbase management system can be configured by setting a fixed storage granularity for the docbase management system, and/or configuring the storage granularity while configuring parameters of the docbase management system, and/or setting the storage granularity when the docbase management system is installed. The information of the organization structure provided by the document data may include information about whether the documents include pages and whether each page includes layers, etc. In addition, the manner for defining the storage granularity of the document data can also be customized by the user. The storage granularity defined may be any hierarchical level in the tree structure of the document data in the docbase management system, e.g., page, layer, etc.; preferably, page is taken as the storage granularity. Different parts of the document data can be split based on the same storage granularity or based on different storage granularities set for the different parts of the document data.

Splitting the document data into data fragments may include: for storage-granularity-relevant data in the document data, data fragments is obtained by splitting the storage-granularity-relevant data based on the defined storage granularity. Furthermore, for storage-granularity-irrelevant data in the document data, e.g., meta data, role data, authority data, navigation data, source file data and font data of the docbase or a document set, the hierarchical level in the tree structure, of the document data, shall be determined first, and all storage-granularity-irrelevant data of the level may be split into one or more data fragments. To be specific, the storage-granularity-irrelevant data can be split into data fragments based on its type, e.g., all navigation data is split into a data fragment, all authority data is split into another data fragment, etc. It depends on practical situations that whether the storage-granularity-irrelevant data shall be split into a single data fragment or multiple data fragments. Each type of storage-granularity-irrelevant data can also be further split into multiple data fragments based on its characteristics. For example, when the storage granularity is document, the storage-granularity-relevant data may be visible content data of the document and the storage-granularity-irrelevant data may be font data, source file data, navigation data, etc, shared within the document. The source file data and font data of different documents may be split into different data fragments respectively instead of be taken as one data fragment.

Step 203: the organization structure of the data fragments is stored.

In this embodiment, the tree structure of the document data in the docbase management system is represented utilizing the tree structure of the XML database. According to such manner, the organization structure of the data fragments shall be stored by: mapping the organization structure onto a tree structure of the XML database, and preferably, storing the mapped tree structure utilizing a collection.

Step 204: the data fragments are stored.

In this step, the data fragments can be stored by converting the data fragments into XML documents and adding the XML documents into corresponding collections.

The workflow of the method for storing document data in a docbase management system provided by this embodiment of the present invention is now completed. Through such method, management functions of the XML database can be adopted to manage the document data in the docbase management system, fulfill requests from applications, locate corresponding data and return the data to the applications.

The greatest benefit with using XML database is the maximized flexibility in information extraction. Through the XPath and XQuery methods supported by XML database, an application can conveniently access document objects, page objects, layer objects, objects within a layer (e.g., graphics, texts, electronic seals, etc.). Theoretically, every object is accessible through the XML database as long as the hierarchical level of the object is included in the structure of the docbase.

In addition, the document data in the docbase management system also includes meta data, authority data, global data, role data, etc, for describing hierarchical structure of docbases and document sets, and those data may appear in different documents or different pages of a document many times. When document data are stored by using the method described above, those data may be saved for many times in different data fragments, which lowers the efficiency of the storage space. In order to increase the efficiency of the storage space, those data can be stored separately. And the method for storing those shared data is described hereinafter by giving an example of storing the global data.

First, global data of document data in a docbase management system is extracted and saved separately.

In this step, the global data may be saved separately by setting up a hierarchical level corresponding to the global data and saving the global data in the form of an XML document, file or binary large object at the hierarchical level.

Second, reference of the global data is recorded in the data fragment containing the global data.

Through the above steps, the global data can be stored once and other data fragments will record no separate global data but the reference of the global data, thus the efficiency of the storage space is improved remarkably. The method for storing other shared data, such as authority data and meta data, is identical to the above method and will not be described further herein.

In this embodiment, the hierarchical level for the global data in step 1 may be set by making the global data correspond to a hierarchical level in a tree structure of an XML database and storing the global data on the hierarchical level. Similarly, hierarchical levels can also be set for meta data, role data, etc., and those data shall be stored on corresponding hierarchical levels.

Figure 4:
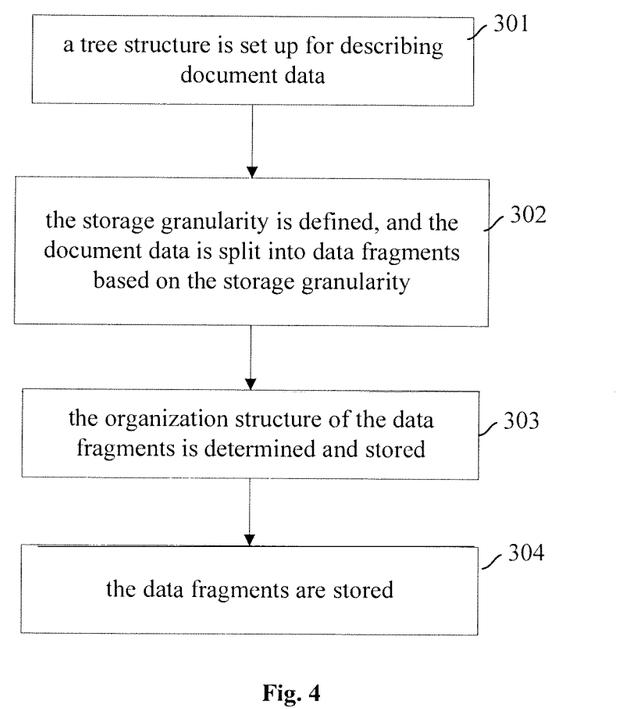
FIG. 4 is a flow chart illustrating a method for storing document data in a docbase management system utilizing a file system.

In the second embodiment of the present invention, the tree structure of the document data in the docbase management system is represented using a file system. According to such manner, the method for storing document data in a docbase management system provided by the present invention shall include the following steps as shown in FIG. 4.

In step 301, the tree structure of the document data in the docbase management system is set up.

In this step, the tree structure of the document data in the docbase management system is identical to the tree structure set in the first embodiment and will not be described repeatedly herein.

The method for representing the tree structure of the document data in the docbase management system may include: representing the tree structure of the document data in the docbase management system utilizing the tree structure of a file system.

For example, the tree structure of the file system can be used for representing the hierarchical structure of the document data in the docbase management system which includes document sets, documents, pages, layers and layer objects, e.g., a hierarchical structure in which a document set includes multiple documents, a document includes multiple pages, a page includes multiple layers and a layer includes multiple layer objects. The tree structure of a docbase can be represented with the following diagram:

DosBase
DocList
  Doc
    Page
      Object.sep In step 302, the storage granularity of the document data in the docbase management system is defined, and the document data in the docbase management system is split into data fragments based on the storage granularity.

In this step, defining the storage granularity of the document data and splitting the document data into data fragments can be performed in the same way as that in the first embodiment and will not be described repeatedly herein.

In step 303, the organization structure of the data fragments is determined and stored.

In this step, the organization structure of the data fragments is determined, e.g., determining the document set, document and page to which data of a layer belongs. Then the organization structure is recorded in the form of a directory in the file system.

For example, when the document data of document Doc1 is to be stored, document Doc1 is in DocList1 and Doc1 includes 3 pages, in which the first page includes three layers and each of the last two pages includes one layer, the organization structure stored in the docbase may be as follows:

DosBase1
DocList1
  Doc1
    Page1
      Layer1.sep
      Layer2.sep
      Layer3.sep
    Page2
      Layer1.sep
    Page3
      Layer1.sep
DocList1

In step 304, the data fragments are stored.

In this step, the data fragments may be stored by storing the data fragments into corresponding directories as files in a file system. The corresponding directories can be the corresponding directories in the organization structure described above.

The workflow of the method for storing document data in a docbase management system provided by this embodiment of the present invention is now completed.

When a document stored by using the method described above is to be accessed, an to-be-accessed object of certain storage granularity (e.g., a layer object) can be located quickly by using document set name+document name+page number+layer number+ . . . , so that related data can be acquired and returned to the requesting application.

In this embodiment, meta data, role data, authority data and global data of document set and docbase can be stored separately to improve the efficiency of the storage space and the method for storing such data separately is similar to that of steps in the first embodiment. The difference lies in that: setting up hierarchical levels for such data in accordance with the method for representing the tree structure of the document data in the docbase management system in this embodiment may include: creating a special directory as the hierarchical level corresponding to the global data in the directories of the file system and storing the global data in this special directory. To be specific, the global data can be saved in the form of file. After that, when storing data fragments which include the global data, the global data included in the data fragments will not be stored repeatedly, only reference of the global data will be stored, hence the efficiency of the storage space can be greatly improved.

Obviously, this embodiment adopts layer as the storage granularity, but directories corresponding to larger or smaller storage granularity can be created for storing the document data based on the larger or smaller storage granularity.

Figure 5:
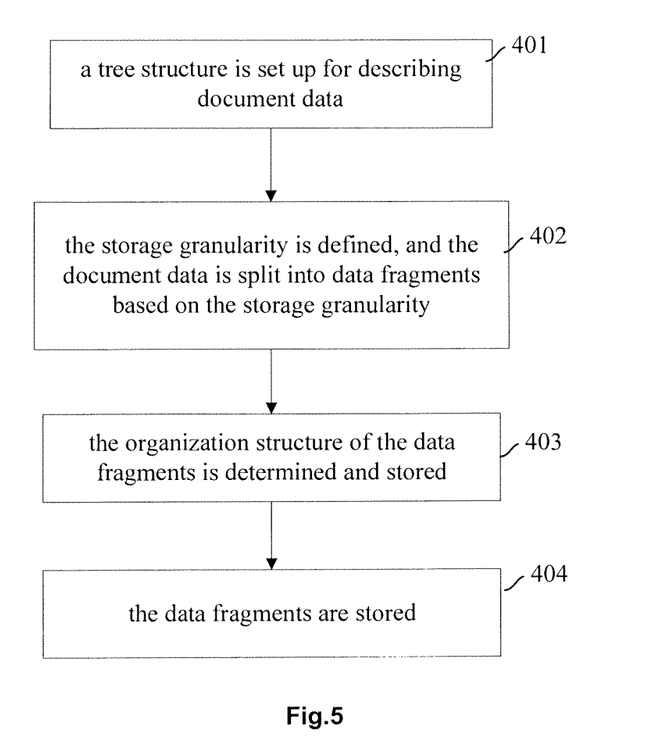
FIG. 5 is a flow chart illustrating a method for storing document data in a docbase management system utilizing a relational database.

In the third embodiment of the present invention, the tree structure of the document data in the docbase management system is described utilizing a relational database. According to such expression, the method provided by the present invention for storing document data in a docbase management system may include the following steps as shown in FIG. 5.

In step 401, a tree structure is set up for describing document data.

In this step, the tree structure for describing the document data is identical to the tree structure set in the first embodiment and will not be described repeatedly herein.

The tree structure may be represented by representing the tree structure of the document data in the docbase management system by using the tree structure in a relational database.

For example, three hierarchical levels, such as, directory (i.e., document set), document and page, are set in the docbase management system, i.e. creating a virtual directory system with three hierarchical levels, i.e., directory, document and page, by utilizing three tables (directory table, document table and page table) in a relational database. The definition of the directory table is shown in Table 1, the definition of the document table is shown in Table 2 and the definition of the page table is shown in Table 3.

TABLE 1

| Field Name | Type | Description |
| --- | --- | --- |
| DirID | INT | Unique ID of the directory |
| DirName | CHAR | Name of the directory |
| ParentID | INT | ID of the parent directory (value 0 is for the root directory) |

TABLE 2

| Field Name | Type | Description |
| --- | --- | --- |
| DocID | INT | Unique ID of the document |
| DocName | CHAR | Name of the document |
| DirID | INT | ID of the directory that the document belongs to |

TABLE 3

| Field Name | Type | Description |
| --- | --- | --- |
| PageNo | INT | Page number |
| DocID | CHAR | ID of the document that the page belongs to |
| PageData | BLOB | Page data |

In step 402, storage granularity of the document data in the docbase management system is defined, and the document data in the docbase management system is split into data fragments based on the storage granularity.

In this embodiment, the methods for defining the storage granularity of the document data and splitting the document data into data fragments are identical to the methods described in the first embodiment and will not be described repeatedly herein.

In step 403, the organization structure of the data fragments is determined and stored.

In this step, the organization structure of the data fragments is determined, e.g., determining the document set, document and page to which data of a layer belongs, and storing this hierarchical structure in the form of a relational table in the relational database.

For example, when document data in document Doc1 is stored, Doc1 is in DocList1 and includes 3 pages, and the storage granularity is page, the organization structure and data fragments in the docbase management system can then be stored in the form of relational tables as shown in Tables 4-6.

TABLE 4

| DirID | DirName | ParentID |
| --- | --- | --- |
| 1 | DocBase | 0 |
| 2 | DocList1 | 1 |
| 3 | DocList2 | 1 |

TABLE 5

| DocID | DocName | DirID |
| --- | --- | --- |
| 1 | Doc1 | 2 |

TABLE 6

| PageNo | DocID | PageData |
| --- | --- | --- |
| 1 | 1 | Data of page 1 in Doc1 |
| 2 | 1 | Data of page 2 in Doc1 |
| 3 | 1 | Data of page 3 in Doc1 |

In step 404, the data fragments are stored.

In this step, the data fragments may be stored by: storing the data fragments into corresponding relational tables as binary large objects in a relational database.

The workflow of the method for storing document data in a docbase management system provided by this embodiment of the present invention is now completed.

In this embodiment, meta data role data, authority data and global data of docbases and document sets can be stored separately to improve the efficiency of the storage space and the method for storing such data separately is similar to steps 1-2 in the first embodiment. The differences lie in that, the setting up hierarchical levels for such data in accordance with the method for describing the tree structure of the document data in the docbase management system in this embodiment may include: creating a special entry in a relational table of the relational database for the hierarchical level of such data and storing the data in this special entry.

In practice, the definition of the hierarchical structure set in step 401 can be modified so that the definition of storage granularity table (i.e., the page table) is as shown in Table 7:

TABLE 7

| Field Name | Type | Description |
|---|---|---|
| PageNo | INT | Page number (value 0 is for global data) |
| DocID | CHAR | ID of the document that the page belongs to |
| PageData | BLOB | Page data |

After the data fragments are saved, the page table is as shown in Table 8:

TABLE 8

| PageNo | DocID | PageData |
|---|---|---|
| 0 | 1 | Global data of Doc1 |
| 1 | 1 | Data of page 1 in Doc1 |
| 2 | 1 | Data of page 2 in Doc1 |
| 3 | 1 | Data of page 3 in Doc1 |

It can be seen that in the relational table, the page of page number 0 indicates the hierarchical level of the global data. Shared data can be saved in a relational table as binary large objects of a relational database. Data fragments that contain the shared data stored will not include the share data, but include references of the share data, thus the efficiency of the storage space can be greatly improved.

Obviously, though the storage granularity adopted in this embodiment is page, relational tables can be created for a larger or smaller storage granularity to store the document data based on the larger or smaller storage granularity.

It can be seen from the description of the embodiments that according to the method adopted provided by the embodiments of the present invention, the tree structure of the docbase management system is set up first, then the storage granularity of the document data in the docbase management system is defined, and after that, the document data in the docbase management system are split into data fragments, the organization structure of the data fragments is determined and stored, and finally the data fragments are stored.

Figure 2:
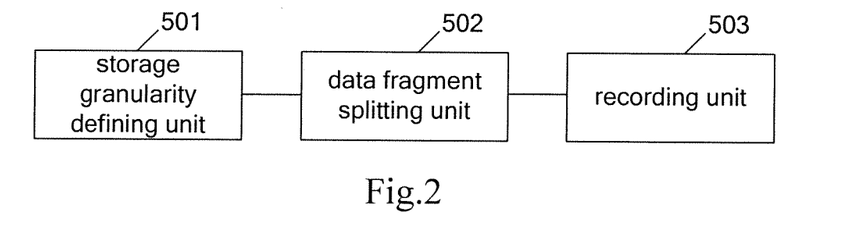
FIG. 2 is a schematic illustrating a structure of an apparatus for storing document data in a docbase management system in accordance with the present invention.

FIG. 2 is a diagram illustrating a structure of an apparatus for storing document data in a docbase management system in accordance with an embodiment of the present invention. As shown in FIG. 2, the apparatus may include a storage granularity defining unit 501, data fragment splitting unit 502 and recording unit 503.

The storage granularity defining unit 501 is adapted to define a storage granularity of the document data in the docbase management system.

The data fragment splitting unit 502 is adapted to split the document data into data fragments based on the storage granularity defined by the storage granularity defining unit 501. The recording unit 503 is adapted to store the organization structure of the data fragments generated by the data fragment splitting unit 502 and store the data fragments generated by the data fragment splitting unit 502 based on the organization structure.

By using the method and apparatus for storing document data in a docbase management system provided by embodiments of the present invention, the document data in the docbase management system can be split into smaller data fragments and stored. A user can then locate data on a level of the smallest storage granularity quickly and accurately when searching or accessing a document, and therefore search the document and extract contents flexibly and efficiently. When applied to web-based document, only the contents in which the user is interested can be transmitted and thus the document transmission workload can be reduced.

Furthermore, when document data are stored according to the embodiments of the present invention, documents of different formats can be stored in a uniform way, hence the interwork and inter-connection between documents is greatly facilitated.

The foregoing is only preferred embodiments of the present invention and is not for use in limiting the protection scope thereof. Any modification, equivalent replacement and improvement made without departing from the principle of the present invention should be included in the protection scope thereof.

The invention claimed is:

1. A method for storing document data, the method comprises:
acquiring a storage granularity of the document data in a docbase management system, wherein, the document data is described by a tree structure in advance;
physically splitting the document data into multiple data fragments by utilizing the storage granularity as a minimum unit for the splitting,
recording the relation of the data fragments obtained by physically splitting the document data, and
storing the data fragments physically,
wherein, each data fragment correspond to a subtree or a node in the tree structure, the storage granularity of the document data is a hierarchical level of the tree structure; and
the hierarchical level of the tree structure includes any of a document level, a page level, an object streams and objects level.

2. The method of claim 1, wherein splitting the document data into multiple data fragments based on the tree structure comprises: splitting global data of each node on a higher level than a level of the storage granularity in the tree structure into one or multiple data fragments as children nodes of the node.

3. The method of claim 2, wherein splitting global data of each node into one or multiple data fragments as children nodes of the node comprises: splitting the global data of the node based on the type of the global data into one or multiple data fragments as children nodes of the node.

4. The method of claim 1, wherein the tree structure is represented by using a tree structure of an eXtensible Markup Language (XML) database, and the storing the data fragments based on the tree structure comprises: mapping each node in the tree structure onto the tree structure of the XML database for storing the node; converting the data fragments into XML documents in the database and adding the XML documents into the tree structure of the XML database.

5. The method of claim 1, wherein the tree structure is represented by using directories of a file system, and the storing the data fragments based on the tree structure comprises: storing the data fragments as files in the file system and setting up a directory for each of the files.

6. The method of claim 1, wherein the tree structure is represented by using relational tables of a relational database, and the storing the data fragments based on the tree structure comprises: describing information of each node and parent nodes of the node in the tree structure with at least one relational table in the relational database; and storing the data fragments as large objects of the relational database.

7. The method of claim 1, wherein the root node of the tree structure is a document level, and the leaf nodes of the tree structure include any one or any combination of: pages, layers, object streams and objects.

8. An apparatus for storing document data comprising a processor and a memory storing instructions executable by the processor, and further comprising: a first unit, while the instructions are executed by the processor, to acquire a storage granularity of document data in a docbase management system, wherein, the document data is described by a tree structure in advance, physically split the document data into multiple data fragments by utilizing the storage granularity as a minimum unit for the splitting; and a second unit, while the instructions are executed by the processor, to store the data fragments physically and record the relation of the data fragments obtained by physically splitting the document data, wherein, each data fragment generated by the splitting of the first unit corresponds to a subtree or a node in the tree structure, the storage granularity of the document data is a hierarchical level of the tree structure and the hierarchical level of the tree structure includes any of a document level, a page level, an object streams and objects level.

* * * * *